(12) United States Patent
Lee

(10) Patent No.: US 8,715,549 B2
(45) Date of Patent: May 6, 2014

(54) POLYURETHANE-COATED SPANDEX FABRIC-FUSED MIDSOLE AND APPARATUS AND METHOD FOR MANUFACTURING THE SAME

(76) Inventor: Dong-gun Lee, Busan (KR)

( * ) Notice: Subject to any disclaimer, the term of this patent is extended or adjusted under 35 U.S.C. 154(b) by 304 days.

(21) Appl. No.: 13/320,160

(22) PCT Filed: May 12, 2010

(86) PCT No.: PCT/KR2010/003014
§ 371 (c)(1),
(2), (4) Date: Nov. 11, 2011

(87) PCT Pub. No.: WO2010/131908
PCT Pub. Date: Nov. 18, 2010

(65) Prior Publication Data
US 2012/0056345 A1    Mar. 8, 2012

(30) Foreign Application Priority Data

May 14, 2009  (KR) ........................ 10-2009-0042003

(51) Int. Cl.
*B29C 39/00*       (2006.01)
*B29C 55/28*       (2006.01)
*A43B 13/38*       (2006.01)
*A43B 13/12*       (2006.01)
*A43B 13/14*       (2006.01)

(52) U.S. Cl.
USPC ....... 264/46.8; 425/119; 425/388; 425/403.1; 36/44; 36/30 R

(58) Field of Classification Search
None
See application file for complete search history.

(56) References Cited

U.S. PATENT DOCUMENTS 4,286,936 A    9/1981    Hustedt

FOREIGN PATENT DOCUMENTS

| EP | 1125514 | 8/2001 |
|---|---|---|
| KR | 10-2000-0059549 | 10/2000 |
| KR | 10-2001-0045340 | 6/2001 |

*Primary Examiner* — Benjamin Schiffman
(74) *Attorney, Agent, or Firm* — DeLio, Peterson & Curcio, LLC; Peter W. Peterson

(57) ABSTRACT

The present invention relates to a polyurethane-coated (PU-coated) spandex fabric-fused midsole, and an apparatus and method for manufacturing the same, which allow a shoe midsole to be easily and conveniently manufactured through a single automatic process, and allows a PU-coated spandex fabric to be easily fused to a surface of the midsole in the process of manufacturing the midsole.

13 Claims, 7 Drawing Sheets

POLYURETHANE-COATED SPANDEX FABRIC-FUSED MIDSOLE AND APPARATUS AND METHOD FOR MANUFACTURING THE SAME

TECHNICAL FIELD

The present invention relates to a shoe midsole which is a foam-molded product having a cushion function in shoes. More particularly, the present invention relates to a polyurethane-coated (PU-coated) spandex fabric-fused midsole, and an apparatus and method for manufacturing the same, which allow a shoe midsole to be easily and conveniently manufactured through a single automatic process, and allow a PU-coated spandex fabric to be easily fused to a surface of the midsole in the process of manufacturing the midsole.

Background Art

In general, shoes are comprised of a shoe sole to be in contact with ground, and a shoe upper for wrapping a human foot, in which the shoe sole consists of an outsole to be in contact with ground, a midsole provided on the top of the outsole to absorb shock applied to the foot at the time of walking or running, and an insole provided on the top of the midsole to be in contact with a bottom of foot.

Such a midsole is formed by a foam-molded product with a predetermined shape, in which the product is usually obtained by foaming a polyurethane resin which is light and has a good cushion performance. Such a foam-molded midsoles serves to absorb shock applied to a foot or a bottom of foot, joints such as ankles, muscles, ligaments, tendons, or the like, so as to support a pedestrian's weight and any other loads as well as to allow the pedestrian to walk or run in a comfortable condition.

The shoes configured as described above are put on feet, which are such an important part that they are called as a second heart in a human's body, and when a pedestrian walks or runs in a state in which the shoes are put on the feet, the shoes protect the pedestrian from being injured by an externally applied damage, and absorb shock applied at the time of walking or running to protect the pedestrian's feet, joints or the like, so that the pedestrian can walk or run more comfortably.

Recently, various shoes are developed which are improved in terms of function to contribute to the pedestrian's health, to provide a comfortable feeling to the pedestrian during walking or running, and to allow the pedestrian to put the shoes on the feet more easily by making the shoes stimulate the bottoms of the pedestrian's feet to promote blood circulation, by making the shoes exhibit a higher shock absorption performance for absorbing shock applied to feet, and by making the shoes provide a comfortable feeling for the pedestrian's feet wearing the shoes.

A midsole in a shoe sole is manufactured in the following manner: a polyurethane resin is introduced into a bottom mold has at least one midsole's shape portion, and then a top mold is placed on the top of the bottom mold to close the bottom mold.

Next, if the molds are heated to and maintained at a predetermined temperature for a predetermined length of time, the polyurethane resin is molded while being foamed in the molds. In such a state, the top mold is separated from the bottom mold, and then the foam-molded product foamed and molded in the bottom mold is removed from the bottom mold, whereby the manufacturing of a foam-molded midsole with a predetermined shape is completed.

At this time, since the surface of the midsole, i.e. the surface of the foam-molded product obtained by foaming the polyurethane resin is rough, enamel is coated on the surface of the foam-molded product. However, since the foam-molded product is seriously corroded while the enamel is being coated on the surface thereof, it is impossible to form the midsole to have a smooth appearance. In addition, the physical property of the midsole is deteriorated due to chemical action, such as yellowing and hydrolysis. In order to form the surface of such a foam-molded midsole more smoothly, a thin TPU film is occasionally adhered to the polyurethane resin before the resin is foamed.

Adhering of the TPU film is performed in the following manner: a TPU film is placed to cover the top of the bottom mold, and then a middle mold is placed on the top of the bottom mold covered by the TPU film to fix the TPU film to the top of the bottom mold.

Then, if a pump connected to a plurality of fine bores formed in a midsole shape portion in the bottom mold is operated, air existing in a space between the midsole shape portion and the TPU film is discharged to the outside by the pumping force (aspirating force) of the pump. As such, the space between the midsole shape portion and the TPU film is vacuumed, and the TPU film comes into close contact with the inner surfaces of the midsole shape portion in the bottom mold.

Thereafter, a predetermined amount of polyurethane resin is introduced into the midsole shape portion of the bottom mold, in a state in which the TPU film is in close contact with the midsole shape portion, the top mold is placed to cover the top of the bottom mold, and then the molds are heated to and maintained at a predetermined temperature for a predetermined length of time, whereby the polyurethane resin is foamed and molded.

Since the TPU film is adhered to the outer surface of the foam-molded product, the outer surface of the midsole is smoothly formed.

However, in such a conventional midsole manufacturing method, all the processes for manufacturing a midsole, such as placing the top mold to cover the bottom mold or separating the top mold from the bottom mold, adhering the TPU film, introducing the polyurethane resin into the bottom mold, and removing the midsole from the bottom mold, are performed through a worker's manual labor.

As a result, there is a problem in that since the construction of such a midsole manufacturing apparatus is very complicated, and such a midsole manufacturing method is also very complicated and difficult to perform, workability in connection with manufacturing a midsole is very poor in terms of time consumption and productivity loss.

In addition, there is another problem in that since the TPU film should be manually installed on the bottom mold in the process of adhering the TPU film to the outer surfaces of the foam-molded midsole, and the pump used for making the TPU film come into close contact with the inner surfaces of the bottom mold should be operated and stopped or on/off valves coupled to a connection tube for interconnecting the mold and the pump should be opened or closed whenever the TPU film adhering process is started and finished, the working efficiency in connection with manufacturing the midsole is deteriorated.

Furthermore, the midsole having a TPU film adhered thereto has problems in that it is readily torn by an external impact due to its poor tear resistance, it is rapidly deteriorated in terms of physical property when water infiltrates into it, and it is readily worn by external friction due to its poor wear resistance.

DISCLOSURE

Technical Problem

Therefore, the present invention has been made in view of the above-mentioned problems, and the present invention provides a polyurethane-coated (PU-coated) spandex fabric-fused shoe midsole, and an apparatus for manufacturing the same, in which the apparatus is adapted to easily fuse a PU-coated spandex fabric to a surface of the midsole, and allows the manufacturing of such a midsole, including fusing the PU-coated spandex fabric to the surface of the midsole, to be performed in a single automatic process, so that the PU-coated spandex fabric-fused midsole can be manufactured more easily and conveniently.

Technical solution

In accordance with an aspect of the present invention, there is provided a polyurethane-coated (PU-coated) spandex fabric-fused midsole manufacturing apparatus including: a central axis positioned at the central area of the apparatus and rotated by a driving force of a motor; a rotary disc fitted on the central axis to be rotated together with the central axis; a plurality of midsole forming mold units, which are mounted on the outer ends of support members radially extending from the outer circumference of the rotary disc, respectively; a PU-coated spandex fabric supply apparatus installed above the trace of rotation of the midsole forming mold units to provide a PU-coated spandex fabric to each of the midsole forming mold units; vacuum means installed between the rotary disc and the midsole forming mold units to vacuum the inside of a midsole forming mold unit supplied with a PU-coated spandex fabric to such an extent that the PU-coated spandex fabric comes into close contact with the inner surface of the midsole forming mold unit; a resin introducing apparatus installed outside of the trace of rotation of the midsole forming mold units to introduce polyurethane (PU) resin into the midsole forming mold unit having the PU-coated spandex fabric film in contact with inner surface thereof; and a foam-molded product removal apparatus installed outside of the trace of rotation of the midsole forming mold units to remove a foam-molded product formed by foaming the polyurethane resin introduced into the midsole forming unit by leaving the polyurethane resin in the midsole forming mold unit at a predetermined temperature for a predetermined length of time, wherein supplying the PU-coated spandex fabric to any of the midsole forming mold units, continuously vacuuming the inside of the midsole forming mold unit supplied with the PU-coated spandex fabric using the vacuum means to allow the PU-coated spandex fabric to be in close contact with the inner surface of the midsole forming mold unit, introducing the polyurethane resin into the midsole forming mold unit in this condition, and removing the foam-molded product formed by foaming and molding the polyurethane resin are sequentially performed while the rotary disc, each of the midsole forming mold units, and the vacuum means are being rotated in unison together with the central axis.

In accordance with an exemplary embodiment, each of the midsole forming mold units includes: a bottom mold in which at least one midsole forming portion is formed, the midsole molding part having a large number of vacuum bores formed through the midsole molding part and connected to the vacuum means; a middle mold pivotally coupled to one side of the bottom mold to be in contact with the top of the bottom mold, the middle mold having at least one space opened at top and bottom sides in the shape of the midsole; and a top mold coupled to be pivoted by a pneumatic cylinder above the bottom mold coupled to the middle mold, the top mold having at least one protrusion in the shape of the midsole to open or close the top side of the bottom mold.

The inventive PU-coated spandex fabric-fused midsole manufacturing apparatus may further include packing which is provided along the contour of the midsole molding part so as to prevent the PU-coated spandex fabric placed to cover the top of the bottom mold from being pushed.

In addition, the inventive PU-coated spandex fabric-fused midsole manufacturing apparatus may further include a push member for pushing the middle mold so as to make the PU-coated spandex fabric placed to cover the top of the bottom mold and the packing come into close contact with each other, and to make the bottom mold and middle mold come into close contact with each other, the push member being pivotally installed on a lateral side of the middle mold.

The PU-coated spandex fabric supplied from the PU-coated spandex fabric may consist of a spandex fabric and a polyurethane (PA) coating layer, the spandex fabric being positioned to be in contact with the midsole, and the polyurethane coating layer being positioned outside of the midsole.

The vacuum means may include: a plurality of vacuum pumps mounted on the rotary disc and having a pumping force for inhaling air in any of the midsole forming mold units supplied with the PU-coated spandex fabric so that the PU-coated spandex fabric can be in close contact with the inside of the corresponding midsole forming mold unit; a plurality of vacuum tanks, each of which is installed under the bottom mold of one of the midsole forming mold units to be communicated with the large number of vacuum bores formed in the bottom mold; a plurality of air flow tubes installed between and interconnecting the vacuum pumps and the vacuum tanks to discharge air from the inside of each of the midsole forming mold units to the outside, thereby vacuuming the inside of each of the midsole forming mold units by the pumping force of the vacuum pumps; and a plurality of on/off valves installed at desired positions on the air flow tubes, respectively, to open or close the passage of each of the air flow tubes.

In addition, the air flow tubes may include: a plurality of main flow tubes which are installed to be communicated with the vacuum pumps, respectively; a circular flow tube extending outside of the midsole forming mold units in a circular form, the circular flow tube being continuously connected to and communicated with each of the main flow tubes, so that the air existing in the bottom mold supplied with the PU-coated spandex fabric can be inhaled into any of the main flow tubes; and a plurality of branch flow tubes branched from the circular flow tube so as to make the circular flow tube and each of the midsole forming mold units communicate with each other.

The branch flow tubes are preferably branched two or more times so as to make the circular flow tube and the midsole forming mold units be communicated with each other.

In accordance with another aspect of the present invention, there is provided a polyurethane-coated (PU-coated) spandex fabric-fused midsole manufacturing method including: supplying a PU-coated spandex fabric from a PU-coated spandex fabric supply apparatus to the top of a bottom mold of any midsole forming mold unit among a plurality of midsole forming mold units in such a manner that the PU-coated spandex fabric is placed to cover the top of the bottom mold; placing a middle mold on the top of the bottom mold in such a manner that the PU-coated spandex fabric can be closely contacted with and fixed to the top of the bottom mold; vacuuming a space formed between the inner surfaces of the bottom mold and the PU-coated spandex fabric by the pumping force of a vacuum pump, which is a vacuum means, and through air flow tubes in such a manner that the PU-coated spandex fabric can be closely contacted with the bottom surface within the bottom mold; introducing a predetermined amount of polyurethane from a polyurethane resin introducing apparatus into a midsole forming portion in the bottom mold in the state in which the PU-coated spandex fabric is in close contact with the midsole forming portion in the bottom mold; placing a top mold on the top of the bottom mold to cover the top of the bottom mold in the state in which the polyurethane resin is introduced into the bottom mold; heating the midsole forming mold unit at a predetermined temperature for a predetermined length of time to foam-mold the polyurethane resin introduced into the midsole forming portion in the midsole forming mold unit; pivoting and separating the top and middle molds from the bottom mold to open the inside of the bottom mold; and removing the foam-molded product foamed and molded in the bottom mold using a foam-molded product removal apparatus, wherein supplying the PU-coated spandex fabric to a midsole forming mold unit, continuously vacuuming the inside of the midsole forming mold unit supplied with the PU-coated spandex fabric using the vacuum means to allow the PU-coated spandex fabric to be in close contact with the inner surface of the midsole forming mold unit, introducing the polyurethane resin into the midsole forming mold unit to foam-mold the polyurethane resin, and removing a foam-molded product formed by foaming and molding the polyurethane resin are sequentially performed while a rotary disc, each of the midsole forming mold units, and the vacuum means are simultaneously rotated together with a central axis of a PU-coated spandex fabric-fused midsole manufacturing apparatus, whereby a PU-coated spandex fabric-fused midsole can be manufactured through a single automatic process.

The inventive midsole manufacturing method may further include: pushing the middle mold with a push member after placing the middle mold on the top of the bottom mold supplied with the PU-coated spandex fabric to make the bottom mold and the middle mold come into close contact with each other.

The PU-coated spandex fabric supplied from the PU-coated spandex fabric consists of a spandex fabric and a polyurethane (PA) coating layer, the spandex fabric being positioned to be in contact with the midsole, and the polyurethane coating layer being positioned outside of the midsole.

In accordance with still another aspect of the present invention, there is provided a shoe midsole coated with an impermeable thin film on the entire surfaces except the top side thereof, wherein the thin film is a polyurethane-coated (PU-coated) spandex fabric formed by coating a polyurethane (PU) on one side of a spandex fabric, and wherein a foaming material for forming the midsole introduced onto the spandex fabric of the PU-coated spandex fabric placed in a state in which it maintains the contour shape of the midsole flows through the spandex fabric, and then the foaming material is integrally fused with the polyurethane (PU) coating layer, thereby being molded.

Advantageous Effects

In accordance with the present invention, there is provided a shoe midsole manufacturing apparatus which fuses a PU-coated spandex fabric to a midsole, whereby a PU-coated spandex fabric-fused midsole can be manufactured while the rotary disc, each of the mold units, and vacuums means are being rotated in unison together with the central axis of the midsole manufacturing apparatus.

That is, since fusing a PU-coated spandex fabric to the surface of the midsole, opening and closing the molds, introducing and foam-molding polyethylene resin, removing a foam-molded product, i.e. the midsole are sequentially performed by the midsole manufacturing apparatus, the PU-coated spandex fabric-fused midsole can be manufactured with a single automatic process, and the midsole can be manufactured more easily and conveniently. In addition, since time consumption and labor loss in connection with manufacturing such a midsole are substantially reduced, the workability in manufacturing such a midsole can be improved.

In addition, when supplying a PU-coated spandex fabric to the bottom mold of any one molding unit, the PU-coated spandex fabric is automatically supplied to the bottom mold, and the vacuum pump for aspirating air existing in a midsole forming portion and the bottom mold is continuously operated and the corresponding on/off valves are always opened. Therefore, the midsole can be manufactured in the state in which the PU-coated spandex fabric is in close contact with the midsole forming portion in the bottom mold. As a result, the PU-coated spandex fabric can be easily fused to the surface of the midsole, and hence the PU-coated spandex fabric-fused midsole can be easily molded.

Moreover, the PU-coated spandex fabric can be easily adhered and fused to the midsole with a very high adhesive strength. Due to the PU-coated spandex fabric, the midsole is very excellent in terms of bursting strength, and is scarcely torn or punctured by a sharp nail or the like. Furthermore, the midsole has high wear resistance to such an extent that the midsole is scarcely worn by external friction. Moreover, the midsole is very excellent in terms of hydrolysis resistance in relation to water, and is very resistant against solvents or the like.

BRIEF DESCRIPTION OF THE DRAWINGS

The foregoing and other objects, features and advantages of the present invention will become more apparent from the following detailed description when taken in conjunction with the accompanying drawings in which.

BEST MODE

Mode for Invention

Hereinafter, exemplary embodiments of the present invention will be described with reference to the accompanying drawings.

Figure 1:
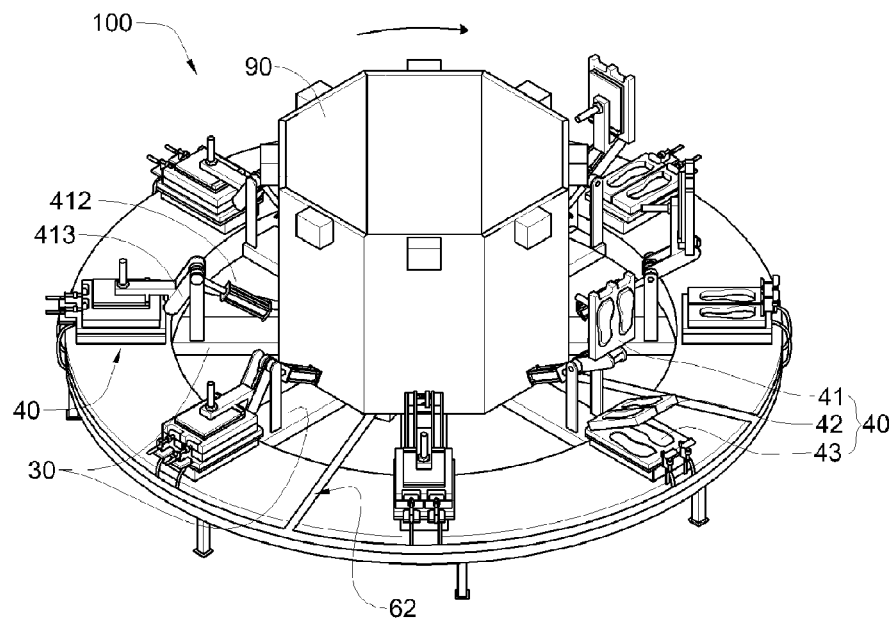
FIG. 1 is a perspective view of the inventive PU-coated spandex fabric-fused midsole manufacturing apparatus.
Figure 2:
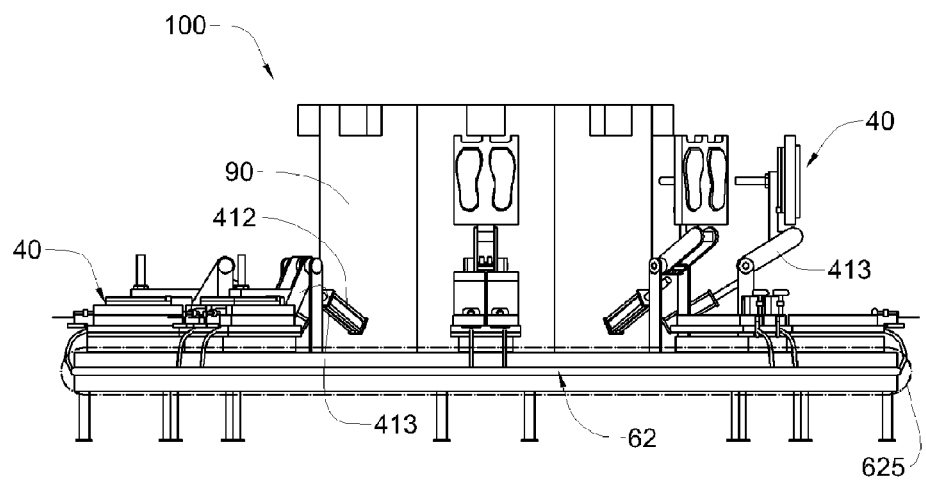
FIG. 2 is a front view of the inventive PU-coated spandex fabric-fused midsole manufacturing apparatus.
Figure 3:
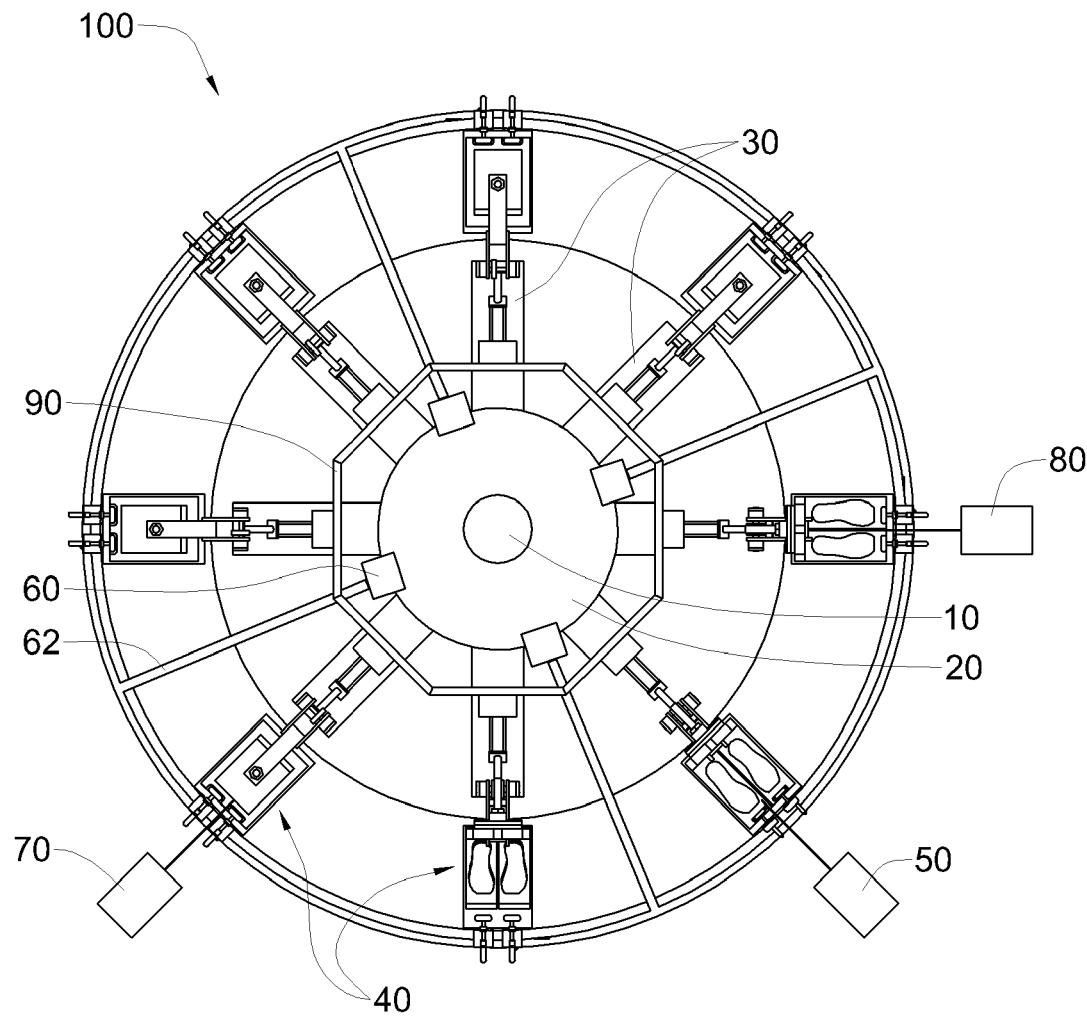
FIG. 3 is a top plan view of the inventive PU-coated spandex fabric-fused midsole manufacturing apparatus.
Figure 4:
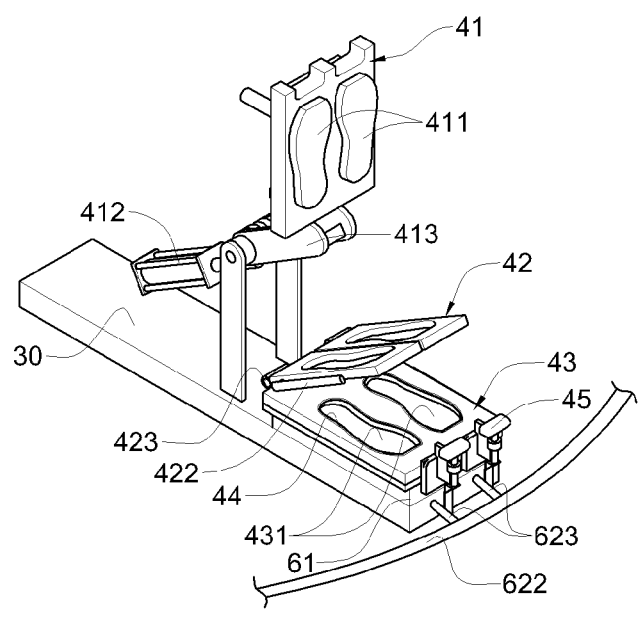
FIG. 4 is a perspective view showing a midsole forming mold unit in the inventive PU-coated spandex fabric-fused midsole manufacturing apparatus.
Figure 5:
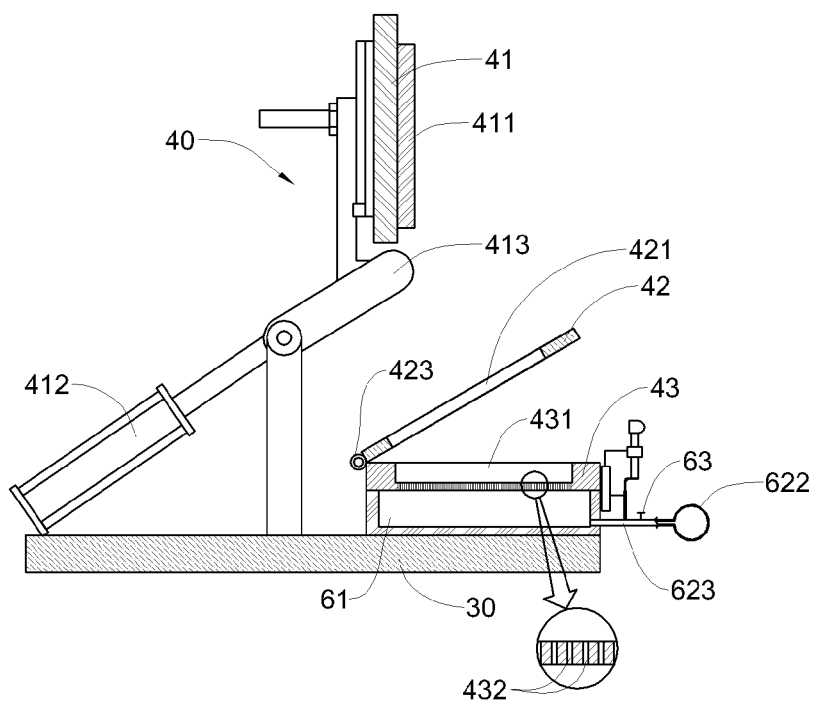
FIGS. 5 to 7 are side views showing how the mold unit in the inventive PU-coated spandex fabric-fused midsole manufacturing apparatus is closed or opened.
Figure 6:
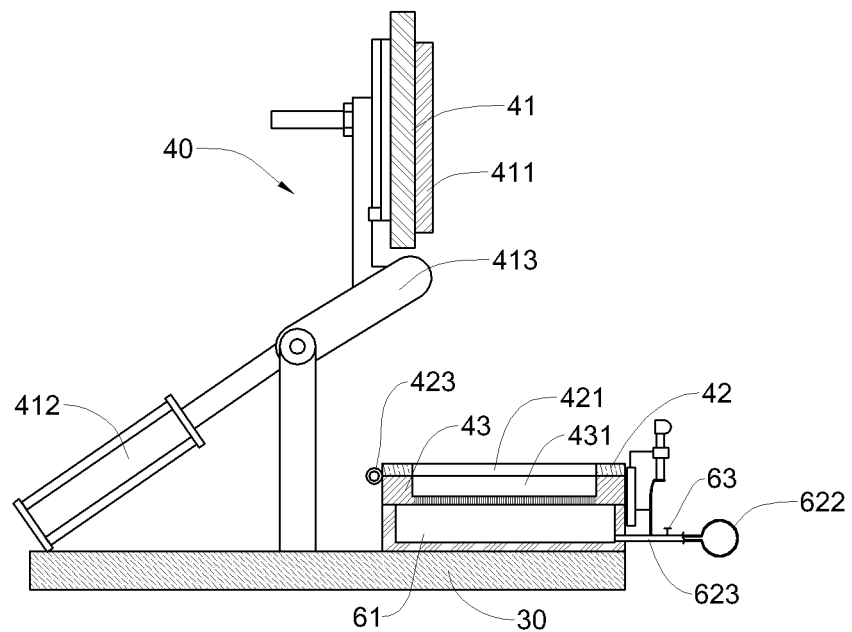
Figure 7:
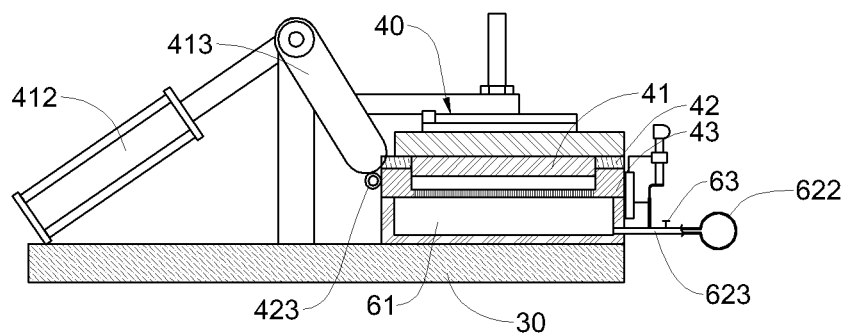
Figure 8:
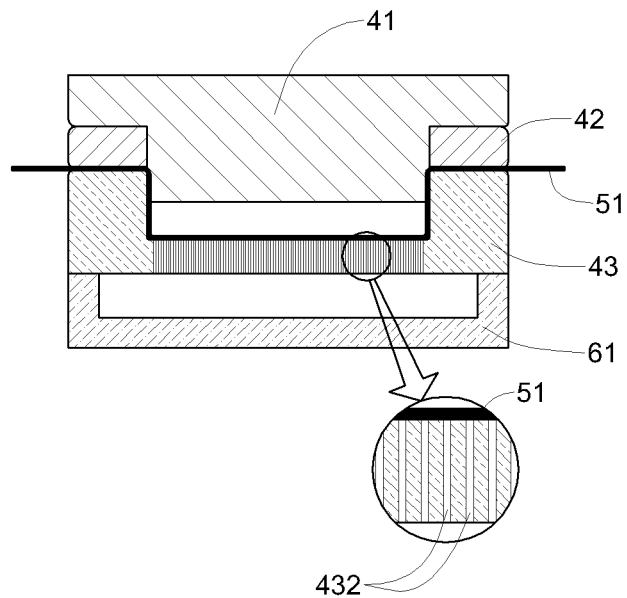
FIG. 8 is a cross-sectional view showing a PU-coated spandex fabric installed in the mold unit in the inventive PU-coated spandex fabric-fused midsole manufacturing apparatus.

FIG. 1 is a perspective view of the inventive PU-coated spandex fabric-fused midsole manufacturing apparatus, FIG. 2 is a front view of the inventive PU-coated spandex fabric-fused midsole manufacturing apparatus, and FIG. 3 is a top plan view of the inventive PU-coated spandex fabric-fused midsole manufacturing apparatus. In addition, FIG. 4 is a perspective view showing a midsole forming mold unit in the inventive PU-coated spandex fabric-fused midsole manufacturing apparatus, FIGS. 5 to 7 are side views showing how the mold unit in the inventive PU-coated spandex fabric-fused midsole manufacturing apparatus is closed or opened, and FIG. 8 is a cross-sectional view showing a PU-coated spandex fabric installed in the mold unit in the inventive PU-coated spandex fabric-fused midsole manufacturing apparatus.

Figure 9:
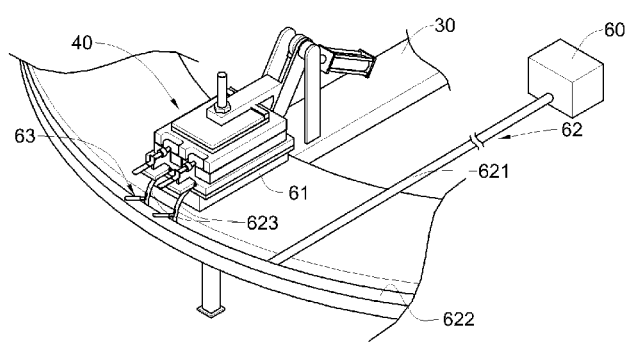
FIG. 9 is a perspective showing a vacuum means in the inventive PU-coated spandex fabric-fused midsole manufacturing apparatus.
Figure 10:
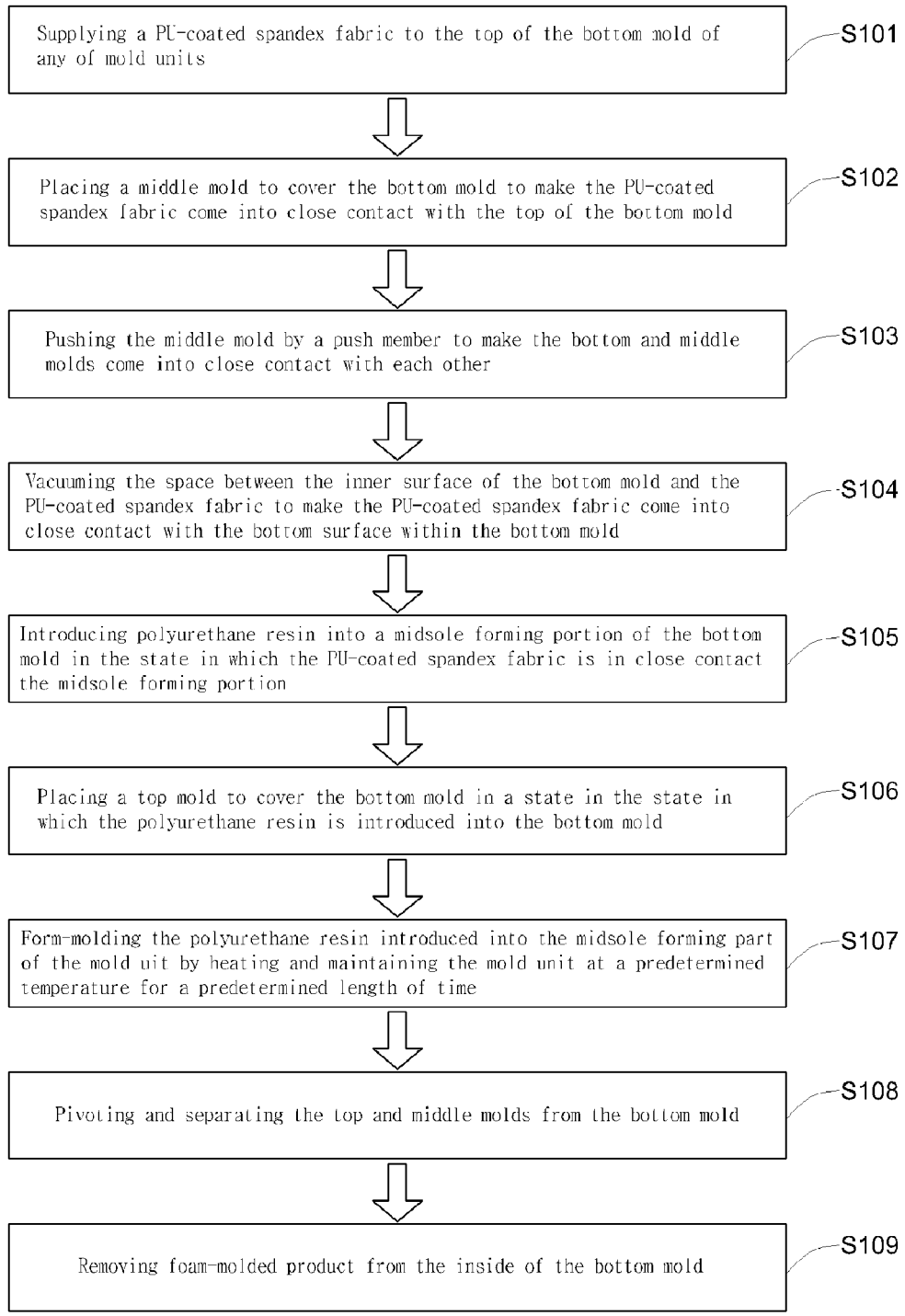
FIG. 10 is a block diagram showing the inventive PU-coated spandex fabric-fused midsole manufacturing method.
Figure 11:
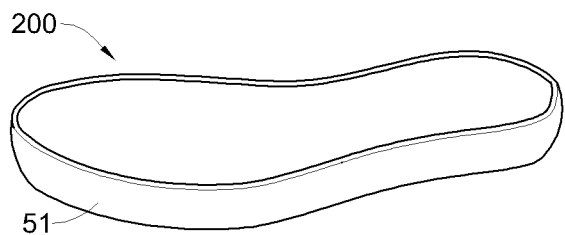
FIGS. 11 and 12 show a construction of a midsole manufactured by the inventive midsole manufacturing apparatus and method.
Figure 12:
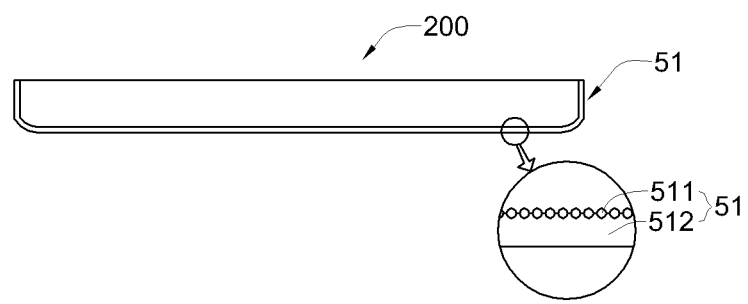

Moreover, FIG. 9 is a perspective showing a vacuum means in the inventive PU-coated spandex fabric-fused midsole manufacturing apparatus, FIG. 10 is a block diagram showing the inventive PU-coated spandex fabric-fused midsole manufacturing method, and FIGS. 11 and 12 show a construction of a midsole manufactured by the inventive midsole manufacturing apparatus and method.

As shown in FIG. 1, the present invention provides a midsole manufacturing apparatus 100 for manufacturing a midsole 200 with a single automatic process, wherein the midsole has a PU-coated spandex fabric 51 fused thereto.

As shown in FIGS. 2 and 3, the midsole manufacturing apparatus 100 has a central axis 10 rotatably positioned at the center of the midsole manufacturing apparatus 100, and a rotary disc 20 fitted on the central axis 10 to be rotated around the central axis 10 together with the central axis 10.

The rotation of the central axis 10 is conducted by the driving force of a motor (not shown), in which the central axis 10 may be rotated by connecting the spindle of the motor directly or through gearing to the central axis 10. Alternatively, any driving unit or means other than such a motor may be selected and employed if the unit or means can rotate the central axis 10.

A plurality of radially extending elongated support members 30 are connected to, the outer circumference of the rotary disc 20, and a plurality of sole forming mold units 40, each of which has at least one midsole forming portion for forming a midsole 200, are mounted on the outer ends of the support members 30, respectively.

Here, flat support plates may be connected to the outer circumference of the rotary disc 20 instead of the support members 30, and a plurality of midsole forming mold units 40 may be radially coupled to the radial outer ends of the flat support plates, respectively, wherein either of the support members 30 or support plates may be selectively used in consideration of the manufacturing purposes and acting effects of the midsole manufacturing apparatus 100, and conditions requested by a purchaser.

As shown in FIGS. 4 to 7, each midsole forming mold unit 40 consists of a top mold 41, a middle mold 42, and a bottom mold 43.

That is, the top mold 41 is positioned at the top side of the mold unit 40 to be rotatable by a pneumatic cylinder 412 and an arm 413, wherein such pneumatic cylinders 412 and arms 413 are mounted on the support members 30, respectively. The top mold has at least one protrusion-shaped part 411, which has a midsole shape and protrudes from the top mold 41.

The bottom mold 43 is positioned at the bottom side of the mold unit 40 and fixedly coupled to the top surface of the end side of the corresponding support member 30. At least one midsole forming portion 431 with a midsole shape is formed in the bottom mold 43, and a large number of fine vacuum bores 432 are formed through the midsole forming portion 431 as shown in FIGS. 5 to 8.

On the top of the bottom mold 43, there is provided packing 44 along the contour of the midsole forming portion 431 in order to prevent a PU-coated spandex fabric 51 placed to cover the top of the bottom mold 43 from being pushed as well as to allow the PU-coated spandex fabric 51 to come into close contact with the top of the bottom mold 43.

The middle mold 42 is pivotally coupled to one side of the bottom mold 43 through one or more hinges 423, wherein the middle mold 42 is placed to cover the top of the bottom mold 43 except the midsole forming portion 431 by being moved to come into contact with the top of the bottom mold 43, or to open the top of the bottom mold 43 by being moved away from the top of the bottom mold 43.

Beyond the hinges 423, various coupling means may be employed to couple the middle mold 42 and the bottom mold 43 if the coupling means allow the middle mold 42 to be pivoted about the one side of the bottom mold 43.

Meanwhile, a push member 45 is pivotally provided at another side of the middle mold 42 to push the middle mold 42 placed on the top of the bottom mold 43 so as to make the PU-coated spandex fabric 51 placed on the top of the bottom mold 43 and the packing 44 come into close contact with each other, and to make the bottom mold 43 and the middle mold 42 come into close contact with each other. The push member 45 is fixedly coupled to one outer lateral side of a vacuum tank 61, which will be described below.

Above the rotation trace of the midsole forming mold units 40, which is positioned laterally outside in relation to the rotary disc 20, there is provided a PU-coated spandex fabric supply apparatus 50 for supplying a PU-coated spandex fabric 51 to any of the mold units 40, i.e. the midsole forming mold unit 40 positioned at a start point for manufacturing the midsole 200.

The PU-coated spandex fabric 51 consists of a spandex fabric 511, which is formed by a plurality of threads tangled up together and has a predetermined elasticity, and a polyurethane (PU) coating layer 512 formed by polyurethane coated on one side of the spandex fabric 511.

Specifically, the PU-coated spandex fabric 51 is formed in the following manner: a spandex fabric 511 is placed on the top of a liquid polyurethane (PU) coating layer 512, and after a predetermined length of time, the PU coating layer 512 is solidified. As such, the spandex fabric 511 and the PU coating layer 512 are integrally bonded to one another in a state in which the PU coating layer 512 is coated on the spandex fabric 511, thereby forming the PU-coated spandex fabric 51. The PU-coated spandex fabric 51 formed thereby is very tough and has a predetermined elasticity.

In addition, a polyurethane resin, which is a foaming material for forming the midsole, is introduced from a resin introducing apparatus (to be described later) into the midsole forming mold unit 40 positioned at the start point, and onto the spandex fabric 511 of the PU-coated spandex fabric 51, which is supplied to the midsole forming mold unit 40 from the PU-coated spandex fabric supply apparatus 50. Then, the introduced polyurethane resin penetrates the spandex fabric 511 of the PU-coated spandex fabric 51, whereby the polyurethane resin is integrally fused to the PU coating layer 512 and molded.

That is, as shown in FIG. 12, the spandex fabric 511 of the PU-coated spandex fabric 51 is positioned to be in contact with the sole 200, and the PU coating layer 512 of the PU-coated spandex fabric 51 is positioned outside of the sole 200 to come into contact with an inner surface of the midsole forming mold unit 40.

In addition, vacuum means is provided between the rotary disc 20 and the midsole forming mold units 40. The vacuum means aspirates air existing in the space formed between the PU-coated spandex fabric 51 supplied to one of the mold units 40 and the inside of the mold unit 40 supplied with the PU-coated spandex fabric 51, i.e. the inside of the mold unit 40, of which the bottom mold 43 is supplied with the PU-coated spandex fabric 51 in such a manner that the PU-coated spandex fabric 51 is placed to cover the top of the bottom mold 43, and discharges the aspirated air to the outside to vacuum the midsole forming portion 431 of the bottom mold 43 so that the PU-coated spandex fabric 51 comes into close contact with the inner surface of the bottom mold 43.

As shown in FIG. 9, as the vacuum means, there are provided, on the rotary disc 40, a plurality of vacuum pumps 60 having a pumping force (aspiration force) for aspirating air existing in the space between the bottom mold 43 of each of the mold units 40 and the PU-coated spandex fabric 51 in such a manner that the PU-coated spandex fabric 51 comes into close contact with the inner surface of each of the mold units 40, i.e. the inner surface of the bottom mold 43 of the mold unit 40 which is supplied with the PU-coated spandex fabric 51.

In addition, as shown in FIG. 8, below each of the mold units 40, i.e. below the bottom mold 43 of each of the mold units 40, a vacuum tank 61 is provided, which is communicated with the large number of vacuum bores 432 formed in the midsole forming portion 431 of the bottom mold 43.

Air flow tubes 62 are provided between the vacuum pumps 60 and the vacuum tanks 61 and interconnect the vacuum pumps 60 and the vacuum tanks. The air flow tubes 62 form flow passages for air which is discharged from the inside of the bottom mold 43 of each of the mold units 40 to produce a vacuum within each of the mold units 40, i.e. in the space between the bottom mold 43 of each of the mold units 40 and the PU-coated spandex fabric 51 by the pumping force of each of the vacuum pumps 60. In addition, on/off valves 63 are provided at predetermined positions on the air flow tubes 62 for closing or opening the passages of the air flow tubes 62, respectively, so as to shut off or allow the flow of discharged air through the air flow tubes 62.

As shown in FIG. 9, the air flow tubes 62 include main flow tubes 621, each of which is installed to be communicated with one of the vacuum pumps 60. A circular flow tube 622 is positioned outside of the trace of rotation of the mold units 40, and the main flow tubes 621 are continuously connected to and communicated with the circular flow tube 622, so that the air within the bottom mold 43 supplied with the PU-coated spandex fabric 51 can be aspirated into the main tube 621. The on/off valves 63 are fitted to the circular tube 63, and branch flow tubes 623 are branched from the circular flow tube 622 so as to make the circular flow tube 622 and the bottom molds 43 of the mold units 40 communicate with each other.

Each of the main flow tube 621 is positioned between two adjacent support members 30 to be continuously connected to the corresponding vacuum pump 60. The circular flow tube 622 is positioned outside of the trace of rotation of the mold units 40, i.e. at the radially outermost position of the midsole manufacturing apparatus 100 in a circular shape as shown in FIGS. 1 and 3.

In addition, the branch flow tubes 623 are formed to be branched two or more times from the circular flow tube 622, so that the circular flow tube 622 and the bottom mold 43 of each of the mold units 40 can be communicated with each other.

That is, the air flow tubes 62 are provided in such a manner that two or more mold units 40 can be connected to one vacuum pump 60.

In order to protect the circular flow tube 622 from external impact, a security film 625 formed from a rubber material is provided to surround the outer circumferential portion of the circular flow tube 622.

Outside of the rotation trace of the midsole forming mold units 40 in another side of the circular flow tube 622, there is provided a polyurethane resin introducing apparatus 70 for introducing a predetermined amount of polyurethane resin, which is a foaming material for forming midsoles, into the midsole forming portion 431 of the bottom mold 43, of which the inner surface is in close contact with the PU-coated spandex fabric 51 and which is covered by the middle mold 42.

In addition, outside of the rotation trace of the midsole forming mold units 40 in yet another side of the circular flow tube 622, there is provided a foam-molded product removal apparatus 80 for removing a product foam-molded in a midsole forming mold unit 40, wherein the product is foamed in a midsole shape in the midsole forming mold unit 40 by introducing molten polyurethane resin into the bottom mold 43 of the mold unit 40, placing the top mold 42 to close the bottom mold 43, and then by leaving the mold unit 40 at a predetermined temperature for a predetermined length of time.

Around the rotary disc 20, there is provided a shield member 90 which is rotated together with the rotary disc 20 and adapted to hide the rotary disc 20, the central axis 10, and the driving unit for rotating the rotary disc 20 not to be shown to the outside.

Now, the present invention configured as described above will be described in terms of functional action.

At first, if electric power is applied to the midsole manufacturing apparatus 100, the central axis 10 is rotated by the driving force of the motor (not shown) provided in the midsole manufacturing apparatus 100. In addition, the rotary disc 20, the support members 30, the midsole forming mold units 40, and the vacuum means are also rotated together with the central axis 10.

Then, a PU-coated spandex fabric 51 is supplied to any of the mold units 40, and comes into close contact with the midsole forming portion 431 in the mold unit 40. Then, polyethylene resin, which is a foaming material for forming a midsole, is introduced into the midsole forming portions 431, and after a predetermined length of time, the polyethylene resin is foamed and molded.

As the foam-molded product, i.e. the midsole 200 with the PU-coated spandex fabric 51 fused to the bottom side and peripheral circumference thereof is removed, the midsole 200 is manufactured.

Now, the process for manufacturing a shoe midsole 200 of will be described in more detail.

As the top mold 41 and the middle mold 42 of the midsole forming mold unit 40 mounted at the outer end of any of the support members 30 radially coupled to the outer circumference of the rotary disc 20 are pivoted upward in the midsole manufacturing apparatus 100, the top side of the bottom mold 43 of the midsole forming mold unit 40 is opened.

That is, the top mold 41 opens or closes the top of the bottom mold 43 as the top mold 41 is pivoted by a pneumatic cylinder 412 and an arm 413, and the middle mold 42 opens or closes the top side boundaries of the bottom mold 43 as the middle mold 42 is pivoted about one side of the bottom mold 43 by operating a pivot operation unit 422, in which the middle mold 42 is coupled to the bottom mold 43 through one or more hinges 423 at the one side of the bottom mold 43.

In the state in which the top of the bottom mold 43 is opened as described above, a PU-coated spandex fabric 51 is supplied from the PU-coated spandex fabric supply apparatus 50, which is installed above the trace of rotation of the midsole forming mold unit 40 to the top of the bottom mold 43 and placed to cover the top of the bottom mold 43 (S101), the trace being positioned at an outer area in the midsole manufacturing apparatus 100.

The PU-coated spandex fabric 51 consists of a spandex fabric 511, which is formed by a plurality of threads tangled up together and has a predetermined elasticity, and a polyurethane (PU) coating layer 512, which is integrally fused on the spandex fabric 511, wherein as shown in FIG. 12, wherein the spandex fabric 511 is positioned to come into contact with the sole 200, and the PU coating layer 512 fabric 51 is positioned outside of the sole 200.

At this time, since the packing 44 is provided on the top of the bottom mold along the midsole forming portion 431 of the bottom mold 43, the packing 44 and the PU-coated spandex fabric 51 supplied to the top of the bottom mold 43 come into close contact with each other, and the packing 44 prevents the PU-coated spandex fabric 51 from being pushed.

Then, as the pivot operation unit 422 coupled to one side of the middle mold 42 is operated, the middle mold 42 is pivoted about the hinges 423 to come into contact with and cover the top side boundaries of the bottom mold 43 (S102).

The push member 45 coupled to one lateral side of the middle mold 42 pushes the top side of the middle mold 42 while being pivoted (S103).

Therefore, the PU-coated spandex fabric 51 and the packing 44 are more closely contacted with each other and the PU-coated spandex fabric 51 is fixed to the packing by the self-weight of the middle mold 42 and the pushing force of the push member 45, and the middle mold 42 and the bottom mold 43 are tightly engaged with each other.

In this state, the vacuum pumps 60 positioned in the inner area of the rotary disc 20 are operated, and hence air existing in the space between the bottom mold 43 and the PU-coated spandex fabric 51 is aspirated into the air flow tubes 62 and flown into the vacuum pumps 60 by the pumping force (aspirating force) of the vacuum pumps 60, thereby being discharged to the outside of the mold unit 40. As a result, vacuum condition is produced between the midsole forming portion 431 of the bottom mold 43 and the PU-coated spandex fabric 51, and the PU-coated spandex fabric 51 comes into close contact with the inner surface of the midsole forming portion 431 of the bottom mold (S104).

That is, the air existing the space between the bottom mold 43 and the PU-coated spandex fabric 51 is aspirated into the vacuum tank 61 through the large number of vacuum bores 432 formed in the midsole forming portion 431 of the bottom mold 43 by the pumping force of the vacuum pumps 60. As s result, the space between the bottom mold 43 and the PU-coated spandex fabric 51 is vacuumed to such an extent that the PU-coated spandex fabric 51 comes into close contact with the inside of the bottom mold 43.

In addition, the air aspirated into the vacuum tank 61 is aspirated into and flown through the branch flow tubes 623 and the circular flow tube 622 of the air flow tube 62 connected to the vacuum tank 61. The air flowing in the circular flow tube 622 is aspirated into and flows in a main flow tube 621 positioned and connected between the corresponding vacuum pump 60 and the circular flow tube 622, and then the air is aspirated into the corresponding vacuum pump 60 and then discharged to the outside of the mold unit 40.

If the inside of the midsole forming portion 431 of the bottom mold 43 of the mold unit 40 is vacuumed and the PU-coated spandex fabric 51 comes into close contact with the inner surface of the midsole forming portion 431 in this manner, a predetermined amount of polyurethane resin is introduced into the midsole forming part 431 of the bottom mold 43 from the polyurethane resin introducing apparatus 70 (S105).

Then, the polyurethane resin introduced into the midsole forming portion 431 flows through the spandex fabric 511 of the PU-coated spandex fabric 51 to be fused to the polyurethane coating layer 512.

In this state, the top mold 41 is placed to cover the top of the bottom mold 42 containing the polyurethane resin. That is, the top mold 41 is pivoted by the pneumatic cylinder 412 and the arm 413 connected to the top mold 41 to cover the bottom mold 43, and the protrusion-shaped portion 411 on the top mold 41 is inserted into the midsole forming portion 431 of the bottom mold 43 (S106).

Thereafter, if the midsole forming mold unit 40 is heated to and maintained at a predetermined temperature for a predetermined length of time in the state in which the polyurethane resin is introduced into the mold unit 40, the polyurethane resin is foamed and expanded in the mold unit 40, thereby being molded in the shape of the midsole 200 (S107).

If the polyurethane resin is foamed and molded into the midsole shape in the mold unit 40, the top mold 41 is pivoted by the pneumatic cylinder 412 and the arm 413, and the middle mold 42 is pivoted about the hinges 423 by the pivot operation unit 422, whereby the top mold 41 and the middle mold 42 are separated from the bottom mold 43 so that the inside of the bottom mold 43 is opened (S108).

In this state, the foam-molded product foam-molded in the bottom mold 43 is removed using the foam-molded product removal apparatus 80 (S109), whereby the manufacturing of the midsole 200 is completed.

As shown in FIGS. 11 and 12, the PU-coated spandex fabric 51, which consists of a spandex fabric 511 and a PU coating layer 412, is integrally fused to the entire surfaces of the midsole 200 except the top side of the midsole, i.e. to the bottom and circumferential surfaces of the midsole 200 in such a manner that the spandex fabric 511 of the PU-coated spandex fabric 51 is positioned to be in contact with the midsole 200 and the PU coating layer 512 is positioned outside of the midsole 200. As a result, the bond strength of the midsole 200 is very high, and the midsole 200 is very excellent in terms of bursting strength, tear resistance and hydrolysis resistance to such an extent that the midsole 200 is not torn or punctured by a sharp nail or the like. In addition, the midsole 200 is very resistant against a solvent or the like, and has a very high wear resistance to such an extent that the midsole 200 is scarcely worn by external friction.

As described above, the individual components of the midsole manufacturing apparatus 100 for manufacturing a midsole 200, i.e. the rotary disc 20, the midsole forming mold units 40, each of which consists of top, middle and bottom molds 41, 42 and 43, the vacuum pumps 60 as the vacuum means, and the air flow tubes 621, 622 and 623 are rotated together with the central axis 10 which is rotated by the motor.

In addition, if the vacuum pumps 60 are continuously operated and the on/off valves 63 are always opened so as to maintain the space between the bottom mold 43 of any of the mold units 40 and the PU-coated spandex fabric 51, the PU-coated spandex fabric 51 comes into close contact with the inner surface of the midsole molding part 432 formed in the bottom mold 43.

In addition, as the midsole manufacturing process of manufacturing a midsole 200, i.e. operating the top, middle and bottom molds 41, 42 and 43 of a mold unit 40, supplying a PU-coated spandex fabric 51 to the mold unit 40, producing vacuum so as to make the PU-coated spandex fabric 51 to the inside of the midsole forming portion 431 of the bottom mold 43, introducing polyurethane resin into the midsole forming portion 431 in which the PU-coated spandex fabric is in close contact with the inside of the midsole forming portion to foam-mold the polyurethane resin, and removing a foam-molded product are sequentially performed, a PU-coated spandex fabric-fused midsole 200 can be manufactured with a single automatic process in the midsole manufacturing apparatus 100.

INDUSTRIAL APPLICABILITY

Although several exemplary embodiments of the present invention have been described for illustrative purposes, those skilled in the art will appreciate that various modifications, additions and substitutions are possible, without departing from the scope and spirit of the invention as disclosed in the accompanying claims.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A polyurethane-coated (PU-coated) spandex fabric-fused midsole manufacturing apparatus comprising:
   a central axis positioned at a central area of the apparatus and rotated by a driving force of a motor;
   a rotary disc fitted on the central axis to be rotated together with the central axis;
   a plurality of midsole forming mold units, which are mounted on outer ends of support members radially extending from an outer circumference of the rotary disc, respectively;
   a PU-coated spandex fabric supply apparatus installed above a trace of rotation of the midsole forming mold units to provide PU-coated spandex fabrics to each of the midsole forming mold units;
   vacuum means installed between the rotary disc and the midsole forming mold units to vacuum an inside of a midsole forming mold unit supplied with a PU-coated spandex fabric to such an extent that the PU-coated spandex fabric comes into close contact with an inner surface of the midsole forming mold unit;
   a resin introducing apparatus installed outside of the trace of rotation of the midsole forming mold units to introduce polyurethane (PU) resin into the midsole forming mold unit having the PU-coated spandex fabric film in close contact with the inner surface thereof; and
   a foam-molded product removal apparatus installed outside of the trace of rotation of the midsole forming mold units to remove a foam-molded product formed by foaming the polyurethane resin introduced into the midsole forming unit by leaving the polyurethane resin in the midsole forming mold unit at a predetermined temperature for a predetermined length of time,
   wherein supplying PU-coated spandex fabrics to any of the midsole forming mold units, continuously vacuuming the inside of the midsole forming mold unit supplied with the PU-coated spandex fabric using the vacuum means to allow the PU-coated spandex fabric to be in close contact with the inner surface of the midsole forming mold unit, introducing the polyurethane resin into the midsole forming mold unit in this condition, and removing the foam-molded product formed by foaming and molding the polyurethane resin are sequentially performed while the rotary disc, each of the midsole forming mold units, and the vacuum means are being rotated in unison together with the central axis.

2. The apparatus as claimed in claim 1, wherein each of the midsole forming mold units comprises:
   a bottom mold in which at least one midsole forming portion is formed, a midsole molding part having a large number of vacuum bores formed through the midsole molding part and connected to the vacuum means;
   a middle mold pivotally coupled to one side of the bottom mold to be in contact with a top of the bottom mold, the middle mold having at least one space opened at top and bottom sides in a shape of the midsole; and
   a top mold coupled to be pivoted by a pneumatic cylinder above the bottom mold coupled to the middle mold, the top mold having at least one protrusion in the shape of the midsole to open or close a top side of the bottom mold.

3. The apparatus as claimed in claim 2, further comprising packing which is provided along a contour of the midsole molding part so as to prevent the PU-coated spandex fabric placed to cover the top of the bottom mold from being pushed.

4. The apparatus as claimed in claim 3, further comprising a push member for pushing the middle mold so as to make the PU-coated spandex fabric placed to cover the top of the bottom mold and the packing come into close contact with each other, and to make the bottom mold and middle mold come into close contact with each other, the push member being pivotally installed on a lateral side of the middle mold.

5. The apparatus as claimed in claim 2, further comprising a push member for pushing the middle mold so as to make the PU-coated spandex fabric placed to cover the top of the bottom mold and a packing come into close contact with each other, and to make the bottom mold and middle mold come into close contact with each other, the push member being pivotally installed on a lateral side of the middle mold.

6. The apparatus as claimed in claim 1, wherein the PU-coated spandex fabric supplied from the PU-coated spandex fabric supply apparatus consists of a spandex fabric and a polyurethane (PA) coating layer, the spandex fabric being positioned to be in contact with the midsole, and the polyurethane coating layer being positioned outside of the midsole.

7. The apparatus as claimed in claim 1, wherein the vacuum means comprises:
   a plurality of vacuum pumps mounted on the rotary disc and having a pumping force for inhaling air in any of the midsole forming mold units supplied with the PU-coated spandex fabric so that the PU-coated spandex fabric can be in close contact with the inside of the corresponding midsole forming mold unit;

a plurality of vacuum tanks, each of which is installed under a bottom mold of one of the midsole forming mold units to be communicated with innumerable vacuum bores formed in the bottom mold;

a plurality of air flow tubes installed between and interconnecting the vacuum pumps and the vacuum tanks to discharge air from the inside of each of the midsole forming mold units to outside, thereby vacuuming the inside of each of the midsole forming mold units by the pumping force of the vacuum pumps; and a plurality of on/off valves installed at desired positions on the air flow tubes, respectively, to open or close the passage of each of the air flow tubes.

8. The apparatus as claimed in claim 7, wherein the air flow tubes comprise:

a plurality of main flow tubes which are installed to be communicated with the vacuum pumps, respectively;

a circular flow tube extending outside of the midsole forming mold units in a circular form, the circular flow tube being continuously connected to and communicated with each of the main flow tubes, so that the air existing in the bottom mold supplied with the PU-coated spandex fabric can be inhaled into any of the main flow tubes; and a plurality of branch flow tubes branched from the circular flow tube so as to make the circular flow tube and each of the midsole forming mold units communicate with each other.

9. The apparatus as claimed in claim 8, wherein the branch flow tubes are branched two or more times so as to make the circular flow tube and the midsole forming mold units be communicated with each other.

10. A polyurethane-coated (PU-coated) spandex fabric-fused midsole manufacturing method comprising:

supplying a PU-coated spandex fabric from a PU-coated spandex fabric supply apparatus to a top of a bottom mold of any midsole forming mold unit among a plurality of midsole forming mold units in such a manner that the PU-coated spandex fabric is placed to cover the top of the bottom mold;

placing a middle mold on the top of the bottom mold in such a manner that the PU-coated spandex fabric can be closely contacted with and fixed to the top of the bottom mold;

vacuuming a space formed between inner surfaces of the bottom mold and the PU-coated spandex fabric by a pumping force of a vacuum pump, which is a vacuum means, and through air flow tubes in such a manner that the PU-coated spandex fabric can be closely contacted with a bottom surface within the bottom mold;

introducing a predetermined amount of polyurethane from a polyurethane resin introducing apparatus into a midsole forming portion in the bottom mold in the state in which the PU-coated spandex fabric is in close contact with the midsole forming portion in the bottom mold;

placing a top mold on the top of the bottom mold to cover the top of the bottom mold in a state in which the polyurethane resin is introduced into the bottom mold;

heating the midsole forming mold unit at a predetermined temperature for a predetermined length of time to foam-mold the polyurethane resin introduced into the midsole forming portion in the midsole forming mold unit;

pivoting and separating the top and middle molds from the bottom mold to open an inside of the bottom mold; and removing a foam-molded product foamed and molded in the bottom mold using a foam-molded product removal apparatus, wherein supplying the PU-coated spandex fabric to a midsole forming mold unit, continuously vacuuming the inside of the midsole forming mold unit supplied with the PU-coated spandex fabric using the vacuum means to allow the PU-coated spandex fabric to be in close contact with the inner surface of the midsole forming mold unit, introducing the polyurethane resin into the midsole forming mold unit to foaming-mold the polyurethane resin, and removing the foam-molded product formed by foaming and molding the polyurethane resin are sequentially performed while a rotary disc, each of the midsole forming mold units, and the vacuum means are simultaneously rotated together with a central axis of a PU-coated spandex fabric-fused midsole manufacturing apparatus, whereby a PU-coated spandex fabric-fused midsole can be manufactured through a single automatic process.

11. The method as claimed in claim 10, further comprising:
pushing the middle mold with a push member after placing the middle mold on the top of the bottom mold supplied with the PU-coated spandex fabric to make the bottom mold and the middle mold come into close contact with each other.

12. The method as claimed in claim 11, wherein the PU-coated spandex fabric supplied from the PU-coated spandex fabric consists of a spandex fabric and a polyurethane (PA) coating layer, the spandex fabric being positioned to be in contact with the midsole, and the polyurethane coating layer being positioned outside of the midsole.

13. A shoe midsole coated with an impermeable thin film on the entire surfaces except the top side thereof, wherein the thin film is a polyurethane-coated (PU-coated) spandex fabric formed by coating a polyurethane (PU) on one side of a spandex fabric, and wherein a foaming material for forming the midsole introduced onto the spandex fabric of the PU-coated spandex fabric placed in a state in which it maintains the contour shape of the midsole flows through the spandex fabric, and then the foaming material is integrally fused with the polyurethane (PU) coating layer, thereby being molded.

* * * * *